United States Patent [19]
Conley

[11] Patent Number: 5,490,347
[45] Date of Patent: Feb. 13, 1996

[54] FISHING LURE

[76] Inventor: Steven P. Conley, 60 Thetford Ave., Braintree, Mass. 02184

[21] Appl. No.: 180,854

[22] Filed: Jan. 12, 1994

[51] Int. Cl.⁶ ..................................... A01K 85/00
[52] U.S. Cl. .................... 43/42.47; 43/42.39; 43/42.48
[58] Field of Search ................... 43/42.39, 42.45, 43/42.47, 42.48, 42.22

[56] References Cited

U.S. PATENT DOCUMENTS

| 2,159,591 | 5/1939 | Leusch | 43/42.48 |
|---|---|---|---|
| 2,561,515 | 7/1951 | Keeler | 43/42.47 |
| 2,828,572 | 4/1958 | Sargent | 43/42.39 |
| 3,044,207 | 7/1962 | Dorsett | 43/42.31 |
| 3,363,359 | 1/1968 | Oney | 43/42.47 |
| 3,922,811 | 12/1975 | Ellingson | 43/42.39 |
| 4,155,191 | 5/1979 | Spivey | 43/42.22 |
| 4,215,507 | 8/1980 | Russell | 43/42.47 |
| 4,445,294 | 5/1984 | Gowing | 43/42.47 |
| 4,761,910 | 8/1988 | Ninomiya | 43/42.31 |
| 4,777,761 | 10/1988 | Renaud | 43/42.47 |
| 4,791,750 | 12/1988 | Gammill | 43/42.31 |
| 4,870,776 | 10/1989 | Schock | 43/42.09 |
| 5,036,617 | 8/1991 | Waldrip | 43/41 |
| 5,168,652 | 12/1992 | Davis | 43/42.23 |
| 5,170,579 | 12/1992 | Hollinger | 43/42.06 |
| 5,189,825 | 3/1993 | Stewart | 43/42.03 |

Primary Examiner—P. Austin Bradley
Assistant Examiner—James Miner
Attorney, Agent, or Firm—Weingarten, Schurgin, Gagnebin & Hayes

[57] ABSTRACT

A fishing lure includes a lure body having a first end and a second end and having a surface with first and second planar portions which intersect at a predetermined location of the lure body surface.

14 Claims, 12 Drawing Sheets

FISHING LURE

FIELD OF THE INVENTION

This invention relates to fishing and more particularly to fishing lures.

BACKGROUND OF THE INVENTION

As is known in the art, fishing lures, and in particular fishing lures of the so-called diving plug type, are typically provided having a body and a single lip which protrudes from a front or a back portion of the body. The lip may be provided from a plastic or a metal material and often has disposed thereon an eyelet to which a fishing line may be attached.

A fisherman, by properly manipulating his fishing pole and/or fishing line, is able to cause a conventional plug to dive and wiggle in a manner intended to attract fish. The fisherman must exhibit a considerable amount of skill manipulating the fishing rod and fishing line to induce particular movements of the lure which may be desirable to attract a fish. The resultant dive angle, dive depth and lure action are determined by a number of factors relating to the size and weight of the lure, the shape of the lip, and the speed with which the lure is retrieved.

Plug type fishing lures typically dive and move along a generally arc shaped path. Furthermore, the angle at which such lures descend (i.e. the lure dive angle) through the water after being cast is typically less than orthogonal to the bottom of the body of water in which the lures are cast. Moreover, it is relatively difficult to control the dive angle of the lures.

SUMMARY OF THE INVENTION

In accordance with the present invention, a fishing lure includes a lure body having a first end and a second end and having a first surface with first and second planar regions which intersect at a predetermined location on the lure body surface. The lure further includes a lip coupled to the lure body on a first one of the first and second ends. With this particular arrangement, a fishing lure which descends in a body of water with a predetermined motion is provided. By providing the lure body having the first and second planar regions the lure descends in water with a predetermined side to side pendulum or wiggling type motion without being manipulated by the fisherman. Thus, the lure can be easily controlled by fisherman in all depths of water. The lure may further include a second lip coupled to tlhe body on a second one of the first and second ends. The second lip allows the lure to descend in the water with a predetermined motion and follows a predetermined path on retrieve when a predetermined size weight is disposed thereon.

In accordance with a further aspect of the present invention, a fishing lure includes a lure body having a front end and a back end and having a surface which has a first flattened portion and a second flattened portion wherein the two flattened portions intersect at a predetermined location on the lure body surface. The lure further includes a first lip coupled to the front end of the lure body and a second lip having a predetermined weight distribution characteristic coupled to the back end of the lure body. With this particular arrangement, a fishing lure which has a particular motion characteristic when moving through a body of water is provided. The lure body may be provided as a buoyant hollow plastic body. The two planar surfaces provide the lure having a shape which allows the lure to sink in a substantially vertical direction in the water. The two flat or planed surfaces also allow the lure to remain horizontal and parallel to the water bottom when the fisherman is retrieving the lure. As the lure travels substantially horizontally through the water along the retrieve path, water flows along and over the contour of the lure body and reaches the second lip. The second lip does not follow the contour of the remaining portion of the lure. Thus the direction of water flow over the lure changes, and gravity and water forces simultaneously act on the lure which causes the lure to move from side to side, such that the lure wiggles or wobbles with the above mentioned pendulum type motion. Similar forces act on the lure as it sinks vertically in the water. Thus, while sinking in the water the lure wiggles with a pendulum type motion without aid from the user. The first lip of the lure is preferably provided having an arc shaped bottom surface and a top surface which includes two intersecting planar regions. The two planar regions intersect at an angle of less than 90 degrees. The predetermined weight distribution characteristic of the second lip may be provided by disposing at least one weight on the second lip. The weight is provided having a height such that a top surface of the weight extends above a first surface of the second lip. The portion of the weight which extends above the first surface of the second lip may be provided having a substantially spherical shape. Furthermore, in a preferred embodiment, the first lip may be provided having a substantially round shape and the second lip may be provided having a substantially rectangular shape. By providing the lure of the present invention with a front lip and a rear lip, the lure has a predetermined side to side wiggling or pendulum type motion when descending in the water. The front lip may be provided from plastic and the rear lip may be provided from metal. The metal lip may be provided, for example having a lead weight disposed thereon or therethrough. Alternatively, the lead weight may be provided as an integral portion of the lip by providing the lip having a particular shape and thickness. The metal lip having a lead weight insert disposed therein provides the lure having a balance point and controls the posture of the lure as the lure descends through the water. The metal lip is provided having a thickness such that it slices through the water with almost no resistance. The metal lip however is weighted such that the lure has a center of gravity and weight distribution scheme which provides the lure having a buoyancy and center of gravity which allows the lure to move through the water with the above described movement characteristics.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
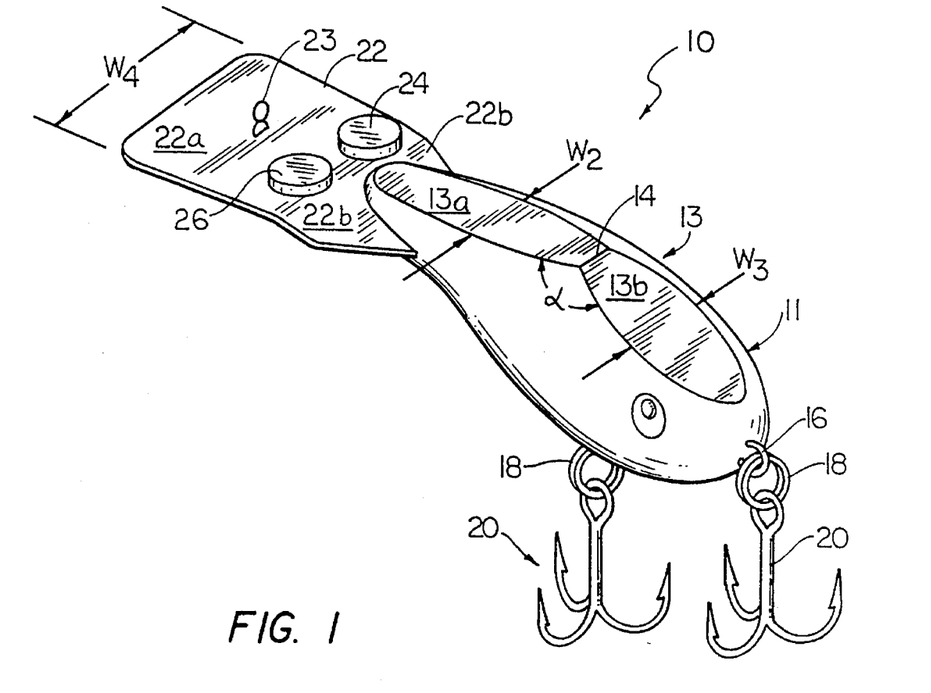
FIG. 1 is a perspective view of a fishing lure.
Figure 1A:
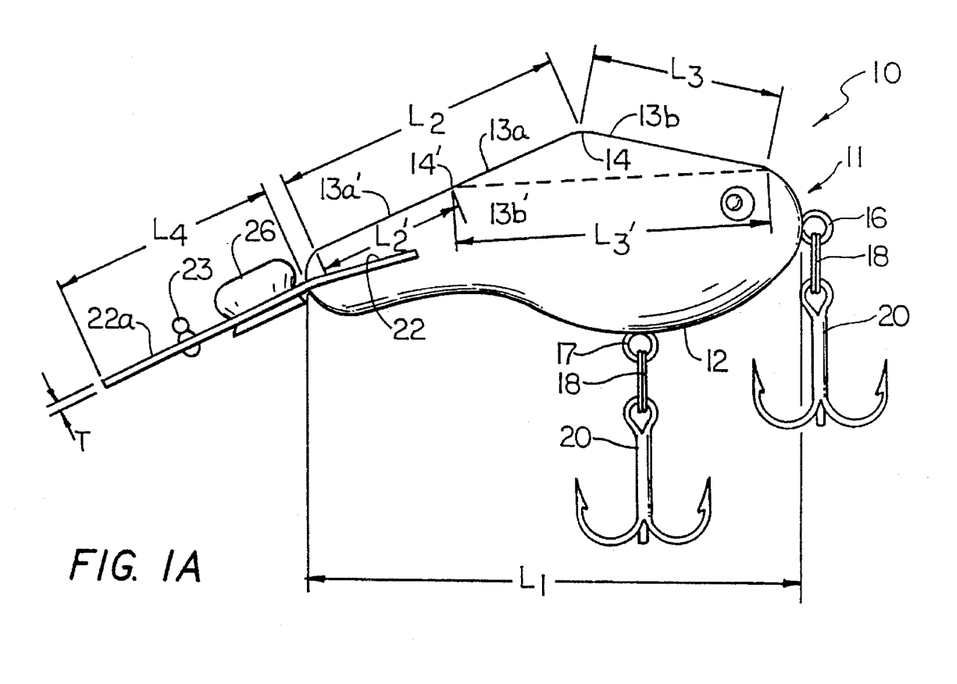
FIG. 1A is a side view of the fishing lure of FIG. 1.
Figure 1B:
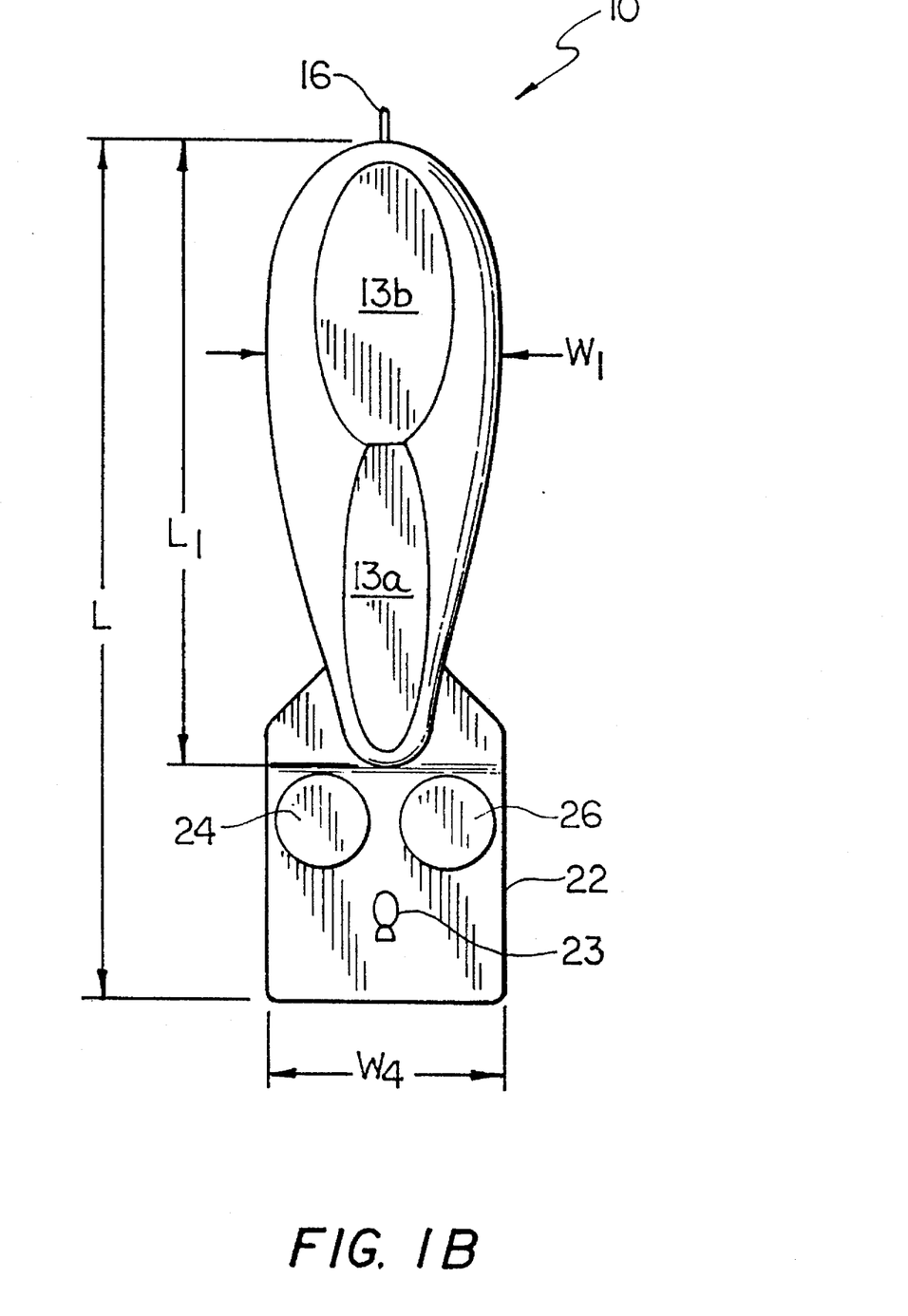
FIG. 1B is a top view of the fishing lure of FIG. 1.

Referring now to FIGS. 1–1B in which like elements are provided having like reference designations, a fishing lure 10 includes a body 11 having a length $L_1$ typically of about 1.75 inches and a width $W_1$ typically of about 0.53 inches. Lure body 11 is a buoyant body or which may be provided from plastic or any other suitable material including but not limited to wood, metal, or rubber such as vinyl plastisol or the like. Lure body 11 may be provided for example as a hollow, plastic buoyant body of the type used in a lure identified as the so-called Big-O versaon of a Gag's Grabber shallow-dive crank bait. Other lure bodies having similar buoyancy characteristics may of course also be used.

Although body 11 is here described having a particular length and width, those of ordinary skill in the art will recognize that body 11 may be provided having a variety of different lengths and widths. For example, body 11 may be provided having a length $L_1$ typically in the range of about 2 inches to 8 inches and having a proportionately selected $W_1$ width typically in the range of about 0.5 inches to 3 inches.

Body 11 has two planar surfaces 13a, 13b on a top or backside 13 and a bottom or belly surface 12 which taper and join at a rear end of lure body 11. Bottom surface 12 has a substantially arcuate shape and planar surfaces 13a, 13b intersect at an angle $\alpha$ to form a ridge 14. Surface 13a is provided having a length $L_2$ typically of about 1 inch and a width $W_2$ typically of about 0.25 inches. Similarly, flattened portion 13b is provided having a length $L_3$ typically of about 0.675 inches and a width $W_3$ typically of about 0.375 inches. Those of ordinary skill in the art will appreciate that in those instances when the overall length $L_1$ and width $W_1$ of body 11 are greater or smaller than 1.75 inches and 0.53 inches respectively, the lengths $L_2$, $L_3$ and widths $W_2$, $W_3$ will have a corresponding increase or decrease in size.

Thus, although the lengths $L_2$ and $L_3$ here correspond to about 1 inch and 0.675 inches respectively and the widths $W_2$ and $W_3$ correspond to about 0.25 inches and 0.375 inches respectively, those of ordinary skill in the art will now appreciate that the length and width of the regions 13a and 13b may be selectd to provide lure 10 having desirable characteristics as will be described in conjunction with FIGS. 5–8 below.

For example, as shown in FIG. 1A, flattened portion 13b may be provided having a length $L_3'$ and flattened portion 13a may be provided having a length $L_2'$. In such an embodiment, intersection 14' is thus located toward the rear portion of lure body 11. It should be noted that in this application where the relative lengths of the surfaces 13a, 13b change, the angle $\alpha$ may also change. It should also be noted that in some applications it may be desirable to provide surfaces 13a, 13b having the lengths $L_2$ and $L_3$ while changing the angle $\alpha$ at which the surfaces 13a, 13b intersect. Such changes may be made of course to provide lure 10 having a particular motion while following either a descent or retrieve path and to allow lure 10 to be easily controlled by the fisherman.

A first eyelet 16 is coupled to a front end of lure body 11 and a second eyelet 17 is coupled to an under portion of lure body 11 on surface 12. Hooks 20 may be coupled to eyelets 16 and 17 via respective ones of rings 18.

A rear lip or tail 22 is coupled to the rear poction of body 11. Tail 22 is provided having a length $L_4$ typically of about 0.75 inches, a width $W_4$ typically of about 0.81 inches and a thickness T typically of about 0.025 inches. Tail 22 is here provided having a substantially rectangular shape. Those of ordinary skill in the art will recognize of course that other shapes including but not limited to square, round, oval and irregular shapes may also be used.

It should be noted that the shape and contour of a tail on a conventional plug type lure typically follows the contour of the lure body and maintains the aerodynamic shape of the lure body.

In the fishing lure of the present invention, however, the tail portion does not follow the contour of the lure body in the conventional manner. Rather, tail 22 has a first surface 22a disposed at an angle which follows the contour of lure body 11 and a second tail portion 22b which does not follow the contour of lure body 11. A line tie 23 is disposed through tail 22 such that a fishing line (not shown) may be coupled thereto.

Figure 4:
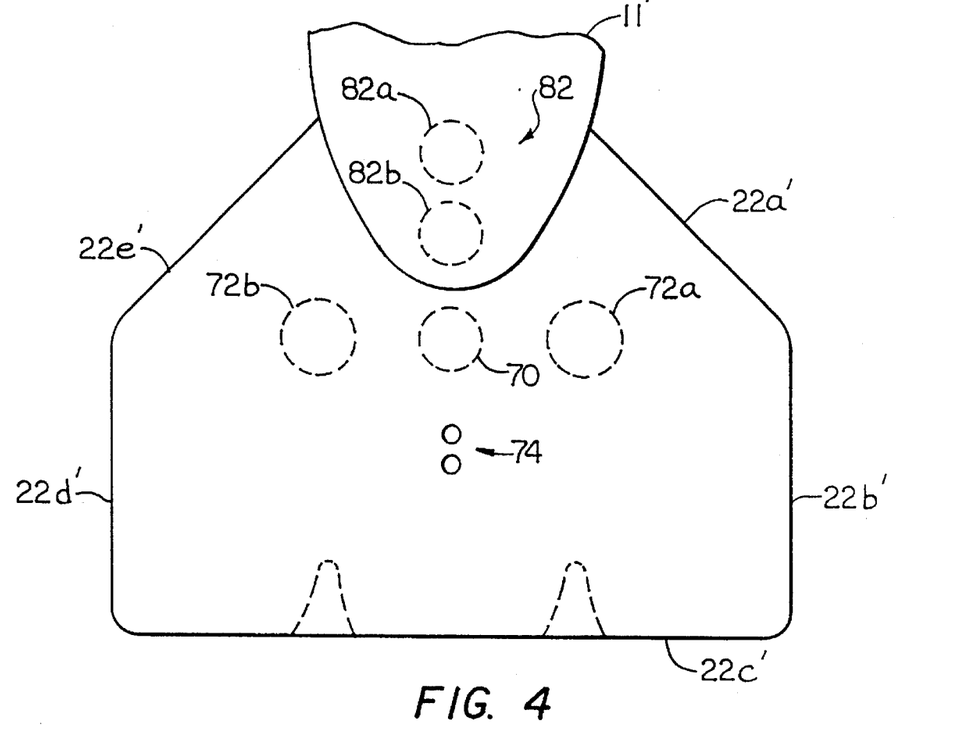
FIG. 4 is a rear portion of a fishing lure which may be of the type described in conjunction with FIG. 1–3 above.

A pair of weights 24, 26 each weighing typically in the range of about 0.80 grams to 1.20 grams are here disposed through lip 22. Weights 24, 26 may be colored to appear as two eyes on lip 22. Alternatively, and as will be described in conjunction with FIG. 4 below, tail 22 may be provided having a single weight weighing in the range of about 1.60 to 2.40 grams disposed therethrough. In yet another alternate embodiment tail 22 may be provided such that weights are integrally distributed throughout tail 22. This may be accomplished for example by providing predetermined regions of tail 22 having increased thicknesses to thus provide tail 22 and consequently lure 10 having a desired weight. Alternatively still weights may be integrally distributed throughout a portion of lure body 11' (FIG. 4).

In operation after lure 10 is cast into a body of water, with the weights 24, 26 equally distributed on both sidei of tail 22, the lure sinks relatively quickly to the water bottom with relatively little, if any, side to side motion.

It should be noted, however, that if weights 24, 26 are distributed such that substantial portions of weights 24, 26 protrude above top surface 22a of tail 22 as shown in FIG. 1A then lure 10 moves with a pendulum-like side to side motion along a substantially vertically descending path through the water. For example, it may be desirable to arrange weights 24, 26 on tail 22 such that 66 percent to 75 percent of the weight body protrudes above top surface 22a of tail 22 to produce the desired pendulum-like side to side motion in lure 10 as lure 10 descends through the water along a substantially vertical path. In this preferred embodiment the amount of offset and weight may be adjusted to provide lure 10 having appropriate motion characteristics.

Figure 2:
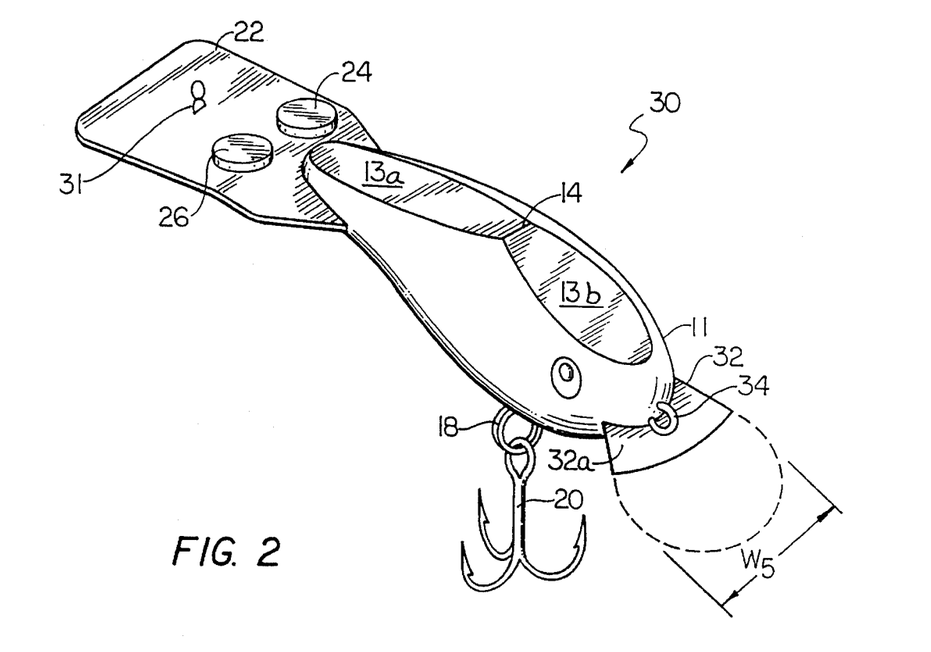
FIG. 2 is a perspective view of a fishing lure.
Figure 2A:
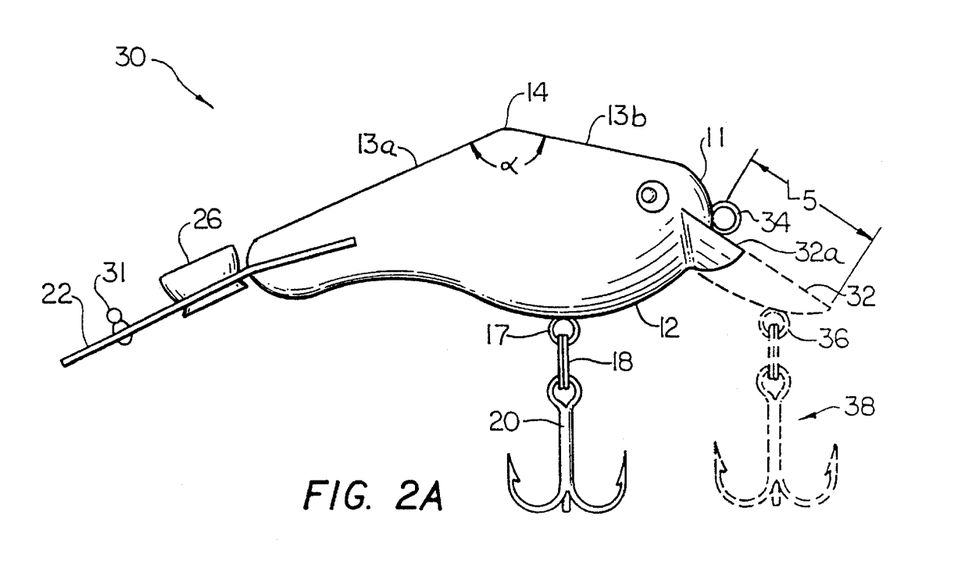
FIG. 2A is a side view of a fishing lure of the type described in conjunction with FIG. 2.
Figure 2B:
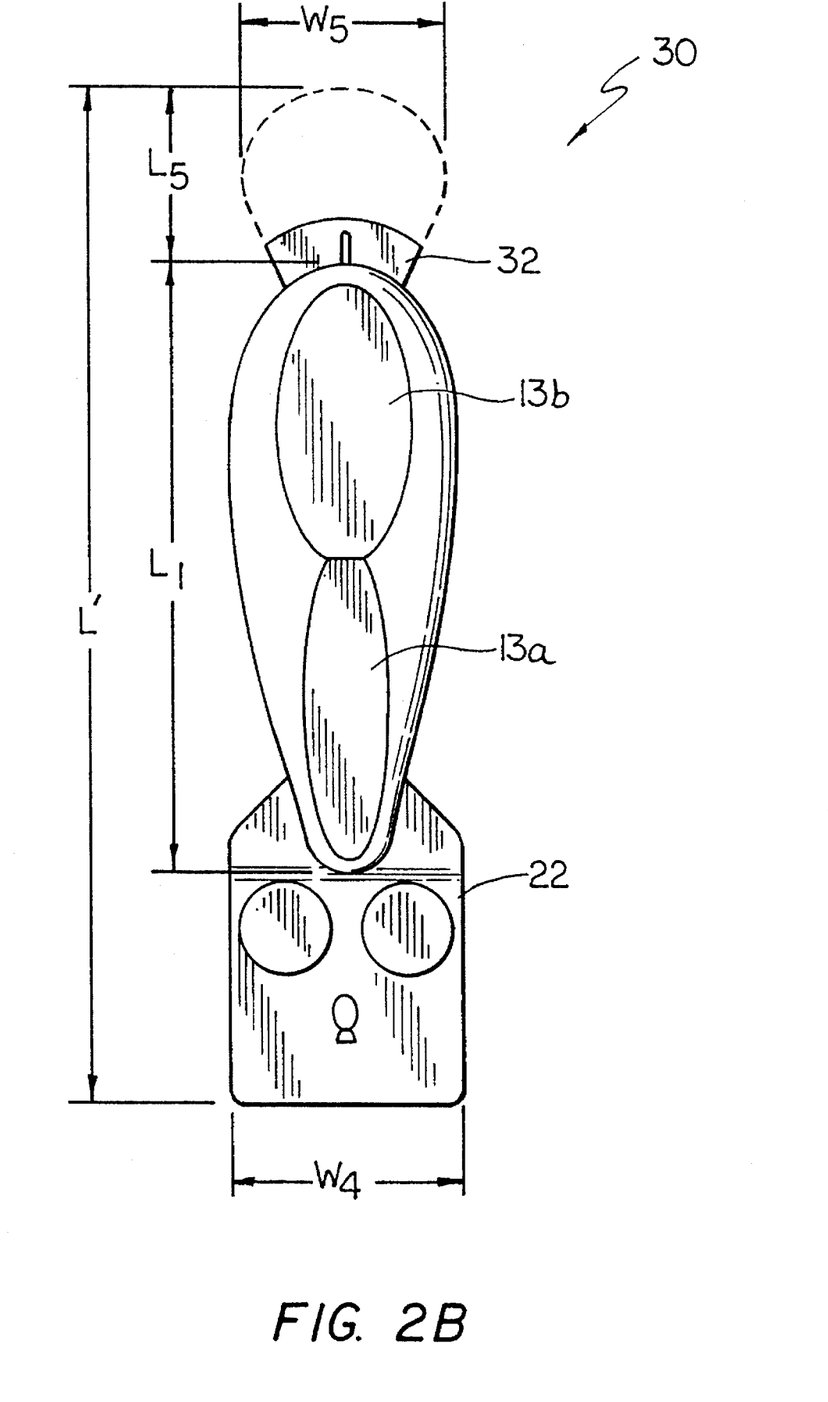
FIG. 2B is a top view of the fishing lure of FIG. 2.

Referring now to FIGS. 2–2B, in which like elements of lure 10 (FIGS. 1–1B) are provided having like reference designations throughout the several views, a lure 30 includes body 11 having two planar surfaces 13a, 13b on surface 13 and a having a curved surface 12. Tail 22 may be provided from metal or any other suitable material including but not limited to wood or plastic and may be embedded or molded between top and bottom tapered sections of body 11. Tail 22 is provided having weights 24 and 26 disposed therein. Tail 22 may optionally include a tie line 31 to which a fishing line may be attached.

Coupled to lure body 11 opposite the rear lip 22 is a front lip or wing 32 having a length L typically of about 0.25 inches, a width $W_5$ typically of about 0.5 inches and a thickness $T_5$ typically of about 0.175 inches. Other lengths, widths and thickness may of course also be used. For example, length $L_5$ may be typically in the range of about 0.15 to 0.6 inches while width Ws may typically be in the range of about 0.4 inches to 0.75 inches. Thus the length, width and thickness of lip 32 may be selected by simply scaling the length, width and thickness of lip 32. Lip 32 is provided having a first, substantially flat surface 32a, a second curved surface 32b and a substantially circular shape.

Lip 32 may be provided from any suitable material including but not limited to plastic, wood or metal and may be fastened to body 11 using any conventional fastening technique. Alternatively, lip 32 may be provided as an integral part of body 11. Lure 30 is here provided having a lure body length $L_1$ (FIG. 2B) typically of about 1.75 inches.

Lure 30 is preferably provided having an overall length L' typically in the range of about 2 to 8 inches. Those of ordinary skill in the art will recognize of course that shorter or longer lures could also be manufactured.

A tie ring 34 to which a hook, here omitted for clarity, may be coupled is disposed on body 11 above lip surface 32a. A second optional tie ring 36 is coupled to bottom lip surface 32b. A second hook assembly 38 may optionally be coupled to tie ring 36 at the bottom surface of lip 32.

The shape of lure body 11, including the shapes of tail 22, body 11 and lip 32 and the location and heaviness of weights 24, 26 are selected such that lure 30 moves through the gater with a predetermined motion as will be described in conjunction with FIG. 5 below. The shape and weight of lure 30 is selected such that lure 30 can be used easily by fisherman in all depths of water. That is, the overall shape of lure 30 including the shapes of body 11, and front and rear lips 22, 32 are such that a fisherman can control the depth fished.

Furthermore, as will be described below in conjunction with FIG. 5, the shape of lure 30 is such that when lure 30 moves through water, lure 30 has a particular motion and the also is capable of changing direction from a horizontally directed path to a vertically directed path. Consequently, lure 30 moves in a manner which makes it appear natural and life-like to thus appeal to the innate predatory instincts of game fish. Thus, lure 30 has a predetermined inherent motion and may also be manipulated by the fisherman.

Figure 2C:
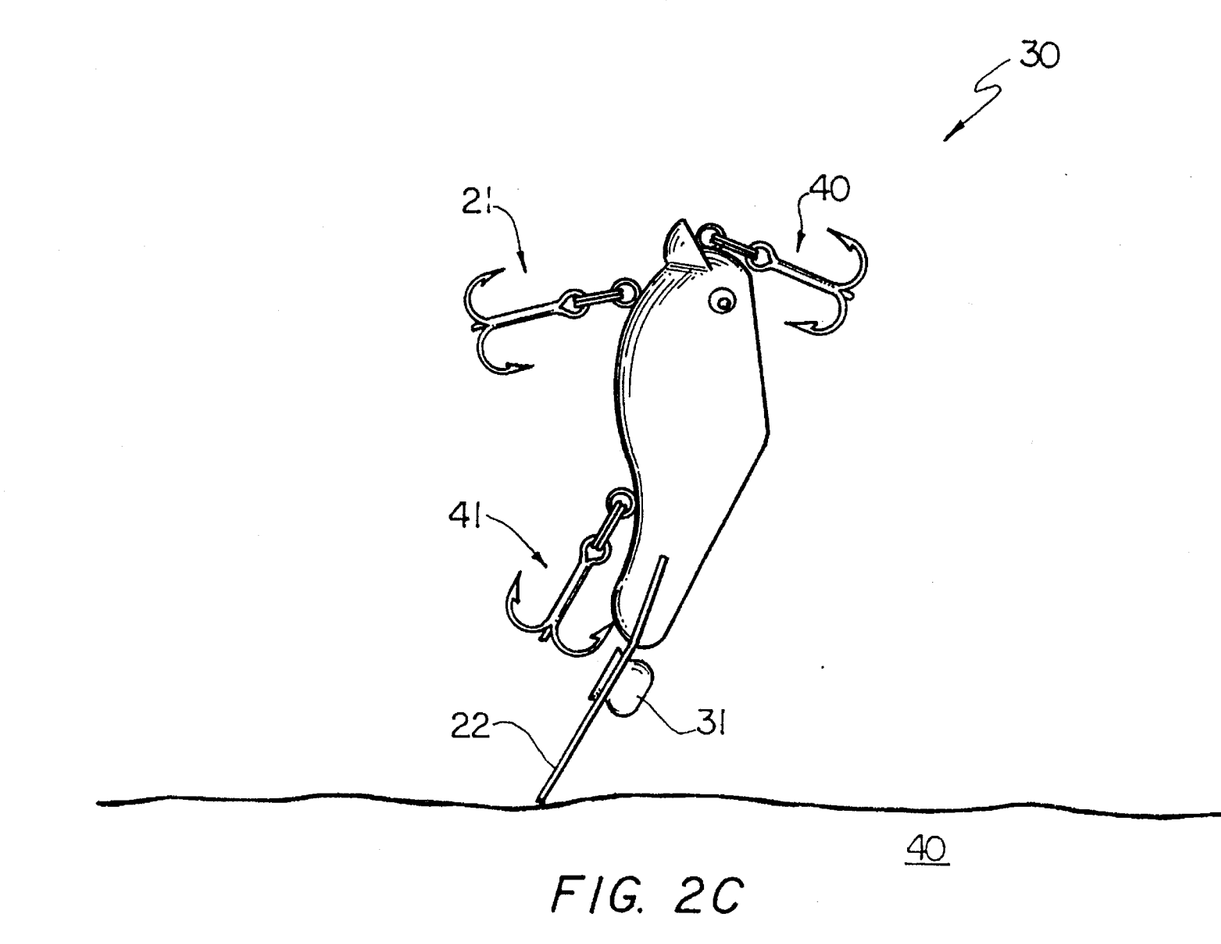
FIG. 2C is a side view showing the position a fishing lure fabricated in accordance with the present invention would have on the bottom of an underwater surface.

Referring now to FIG. 2C, when lure 30 is allowed to follow a substantially vertical path to the bottom of the water 41, lure 30 should stand substantially vertically on the bottom surface. A pair of treble hooks 21, 40 are coupled to lure 30 as shown and a tie line 31 is coupled to the second end of lure 30. A third treble hook 41 may optionally be coupled to the underside of lure 30.

Figure 3:
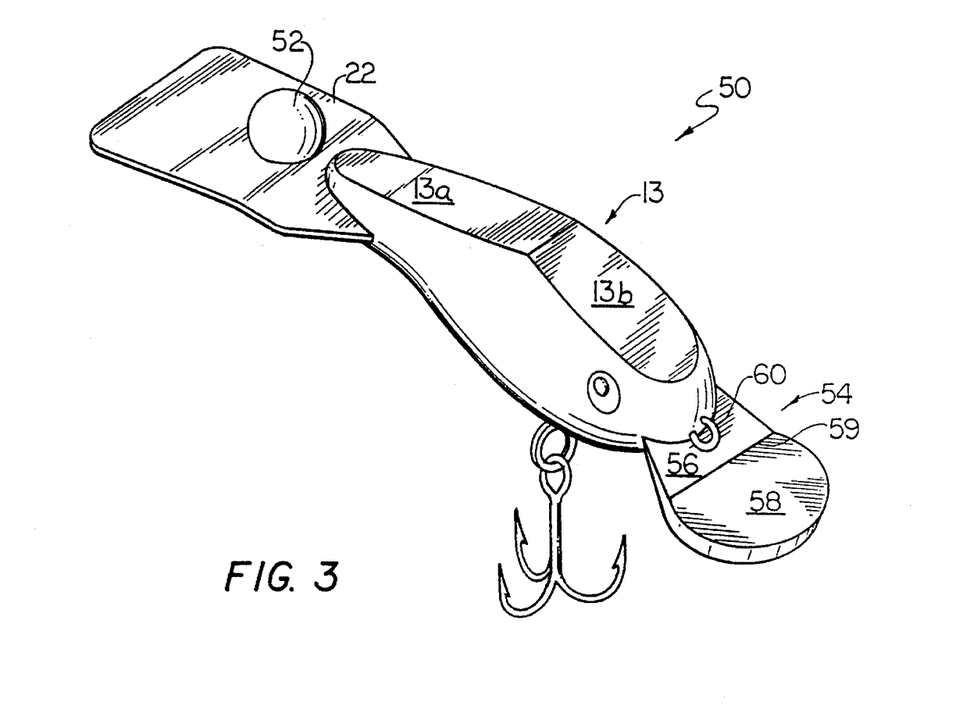
FIG. 3 is a perspective view of a fishing lure.
Figure 3A:
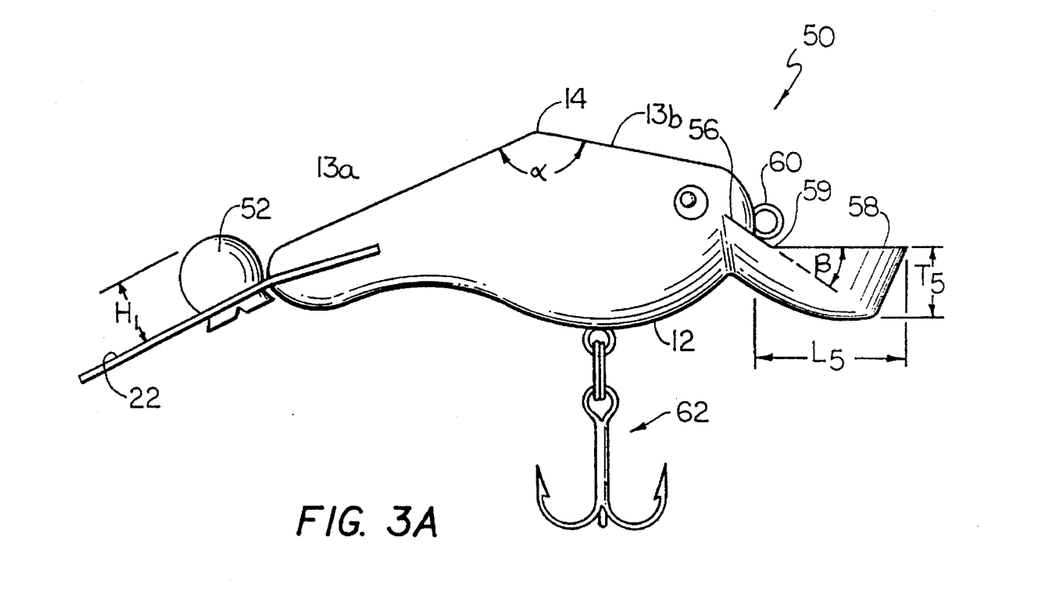
FIG. 3A is a side view of the fishing lure of FIG. 3.
Figure 3B:
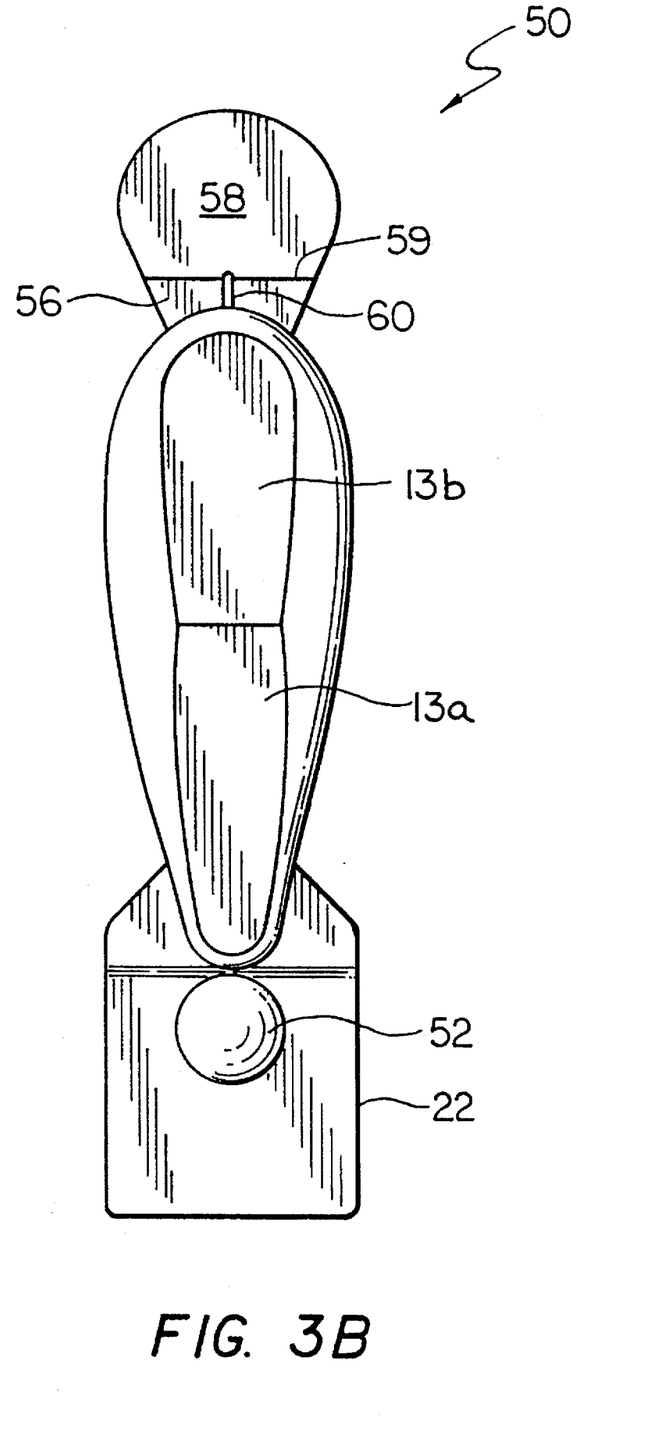
FIG. 3B is a top view of the fishing lure of FIG. 3.

Referring now to FIGS. 3–3B in which like elements of lures 10, 30 described above in conjunction with FIGS. 1–2B are provided having like reference designations, lure 50 includes body 11 having two planar surfaces 13a, 13b on surface 13 and a having second surface 12 having a curved shape.

Tail 22 may be provided from metal or any other suitable material including but not limited to wood or plastic and may be embedded or molded between top and bottom tapered sections of body 11. Tail 22 is provided having a single weight 52 disposed thereon. Weight 52 is here provided having a spherical shape with a diameter typically of about 0.30 inches, a height H1 typically of about 0.250 inches and a weight typically in the range of about 2.00 grams to 2.75 grams.

Coupled to lure body 11 opposite the rear lip 22 is a front lip or wing 54 having a length $L_5$ typically of about 0.56 inches, a width $W_5$ typically of about 0.725 inches and a thicknes $T_5$ typically of about 0.175 inches. Lip 54 has a substantially circular shape and includes two planar surfaces 56, 58 which intersect at a ridge 59. Lip surfaces 56, 58 thus form an angle $\beta$ which here corresponds to an angle typically of about 35 degrees.

It should be noted that surfaces 56, 58 may be disposed such that the angle $\beta$ is typically in the range of about 5 to 75 degrees. The particular angle which surfaces 56, 58 form is selected such that lure 50 moves through the water with a predetermined motion.

In particular, and as will be described in conjunction with FIG. 6B below, the angled surfaces cause lure 50 to rise in a substantially vertical direction along an irregular path when lure 50 is being retrieved by the fisherman. Thus, lure 50 may be especially useful when a fisherman desires to perform so-called vertical jigging while casting. That is, lure 50 may be cast with a fishing rod and by lifting the rod or retrieving the lure, the lure rises in a substantially vertically direction toward the surface of the water. When the lift or retrieve motion is stopped, the lure sinks in a substantially vertical direction with the pendulum-like motion described below in conjunction with FIG. 5. It is believed the front lip 54 forces the lure to rise in a substantially vertical direction in response to the lift or retrieve motion.

Lip 54 may be provided from any suitable material including but not limited to plastic, wood or metal and may be fastened to body 11 using any conventional fastening technique. Alternatively, front lip 54 may be molded as an integral portion of body 11.

Lure 50 is preferably provided having an overall length L between 2 and 8 inches but those of ordinary skill in the art will recognize of course that shorter or longer lures could also be manufactured. In such instances lip 54 may be provided having an appropriately scaled length, width and thickness.

A ring 60 is here disposed on body 11 above surface 56. A second optional tie ring may be coupled to a bottom surface of lip 54. On a relatively large lure, the line tie placement may be incorporated in the lip itself to insure that lure 50 moves with a desired side to side pendulum type motion as lure 50 descends through the water.

A hook assembly 62 is coupled to surface 12. It should also be noted that in some applications it may be desirable to provide hook assembly 62 as a single double or treble weedless hook assembly.

Referring now to FIG. 4, a portion of a lure body 11' includes a tail 22'. Tail 22' may be of the type disposed on lure 10 (FIGS. 1–1A), lure 30 (FIGS. 2–2B) or lure 50 (FIGS. 3–3B). Tail 22' may be provided from metal, plastic or any other suitable material. Tail 22' has provided therein a central aperture 70. Alternatively, in some instances it may be desirable to omit central aperture 70 and to provide tail 22' having a pair of apertures 72a, 72b generally denoted 72. Tail 22' may also be provided with an optional tie line 74 to which a fishing line (not shown) may be attached.

Figure 4A:
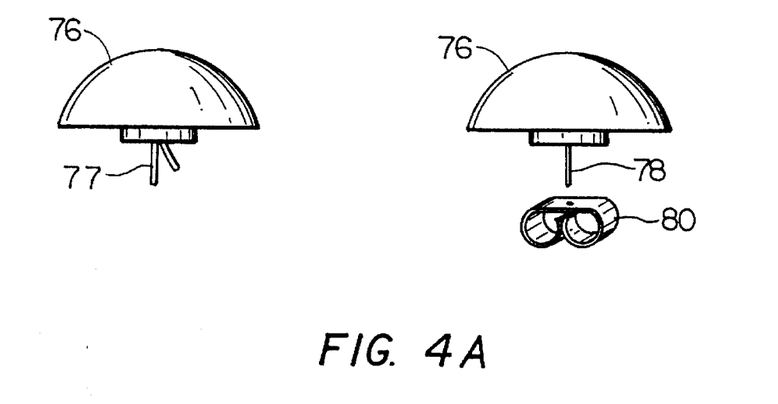
FIG. 4A is a side view of a weight which may be used in the lure of present invention.

Referring briefly to FIG. 4A, a weight 76 may be disposed through one of the apertures 70, 72 (FIG. 4). Weight 76 may be made of lead or any other suitable material well know to those of ordinary skill in the art. Weight 76 is disposed in one of the apertures 70, 72 and coupled to tail 22' using a fastener such as a screw, a nut and bolt arrangement or any other type of fastener well know those of ordinary skill in the art.

For example, weight 76 may be provided having a cotter pin molded therein such that weight 76 may be removably coupled to tail 22'. Alternatively, weight 76 may be provided having a post 78 projecting from a first surface thereof. Post 78 may be disposed through one of the apertures 70, 72. A clasp 80 or any other means is then coupled to post 78 to thus hold weight 76 to tail 22'.

Alternatively still, weight 76 may be permanently coupled to tail 22'. For example, weight 76 may be formed directly as part of tail 22' or alternatively weight 76 and tail 22' may be manufactured as separate pieces and may be coupled together, for example, by a press fit, by crimping, by a waterproof adhesive or any other like means.

Referring again to FIG. 4, tail 22' is provide having a plurality of edges 22a'–22e'. Edge 22c' is here shown having a straight shape, however, as shown in phantom rear edge 22c' may be provided having a scalloped shape or any other irregular shape. Other curved shapes may of course also be used.

In an alternate embodiment weights 82a, 82b may be disposed in lure body 11' as shown. That is, lure body 11' may be provided having a cavity region in which weights 82 are disposed. Thus the lure would have loose lead inserts and may be converted from a floater/diver to a lure which behaves similar to lure 10, 30 or 50 in accordance with the present invention. Weights 82 can be held in place by screwing, with a shaft and clasp arrangement by molded cotter pin arrangement, by gluing or by any other fastening means. In such an embodiment tail 22' may be provided having one or more of apertures 70, 72 to help stabilize lure body 11' as it moves through the water. Alternatively, when weights are disposed in lure body 11' apertures 70, 72 may be omitted from tail 22'.

Figure 5:
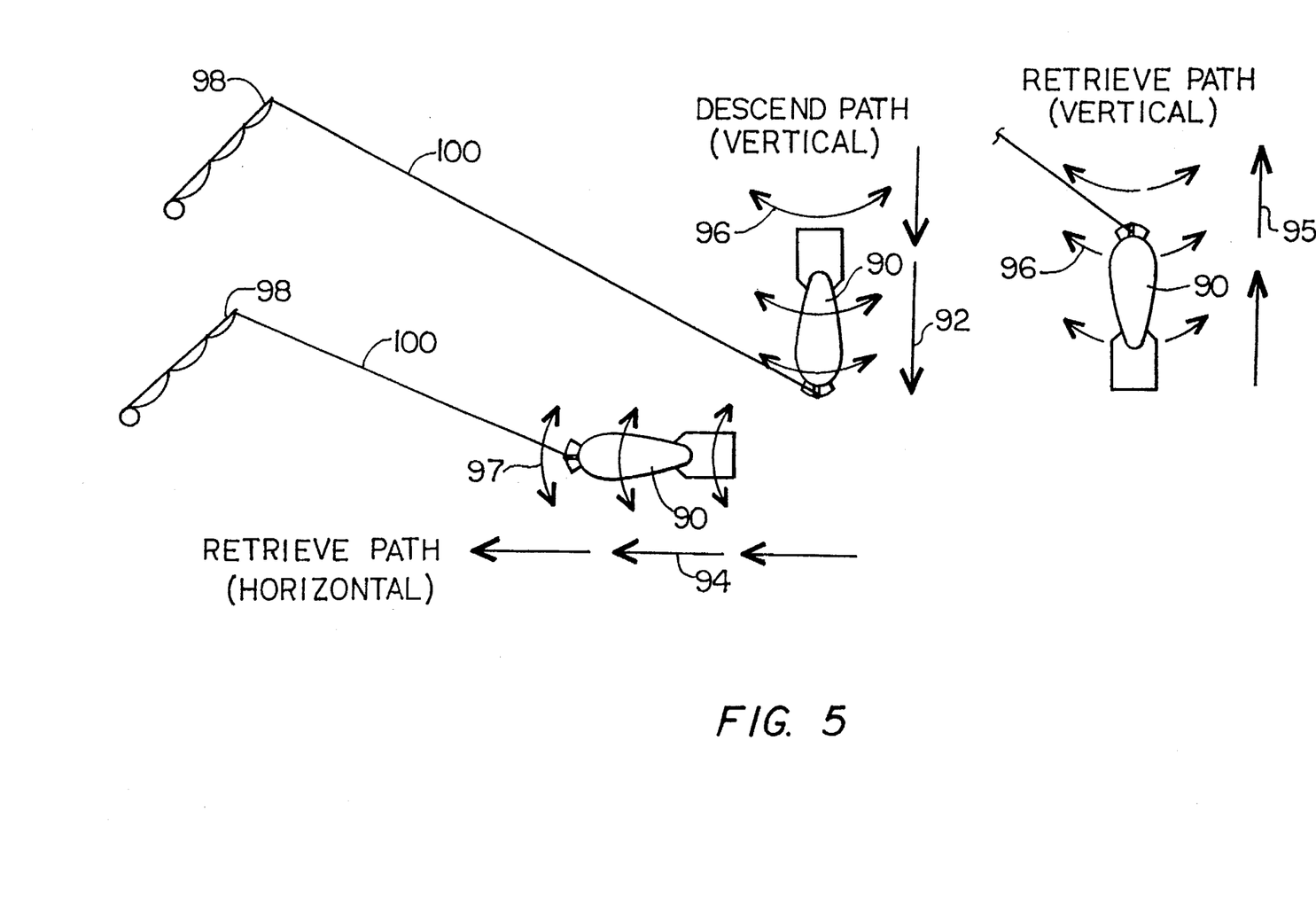
FIG. 5 is a diagrammatical view showing a lure motion followed by a fishing lure of the types described in conjunction with FIGS. 1–3.

Referring now to FIG. 5, a lure 90 representative of each of lures 10 and 30 described above in conjunction with FIGS. 1 and 2 is shown following a substantially vertical descent path 92. Lures 10 and 30 follow a substantially horizontal retrieve path 94. Lure 50, on the other hand, follows the substantially vertical descent path 92 but follows a rising retrieve path 95. Lure 50 rises with its back side surfaces 13a, 13b, (FIG. 3B) toward the aser with the fishing line coupled to line tie 60 (FIGS. 3A, 3B). As indicated by arrows 96 lure 90 moves with two distinct motions or actions which resemble a pendulum type action on the descent and retrieve paths 92, 94 and 95.

The first motion occurs after lure 90 is cast into the water. When first cast into the water and before the fisherman begins a retrieve cycle, lure 90 begins a predetermined, unaided, naturally-appearing, substantially vertical descent downward along path 92. Lures 30 and 50 while following descent path 92 exhibit a relatively slow side to side wiggling motion 96 simulating the movements of a bait-fish or crayfish lazily moving through the water. Lure 10, when-having weights appropriately arranged therein as described above in conjunction with FIG. 1 will also exhibit a similar side to side wiggling motion.

In response to the fishing rod tip 98 being swept or the fishing line 100 being reeled in, lure 90 will change direction, flatten out and follow the a substantially horizontal retrieve path 94. While following retrieve path 94 lure 90 begins a new much tighter side to side wiggle motion 97 to thus simulate a frightened or excited bait fish.

Figure 6:
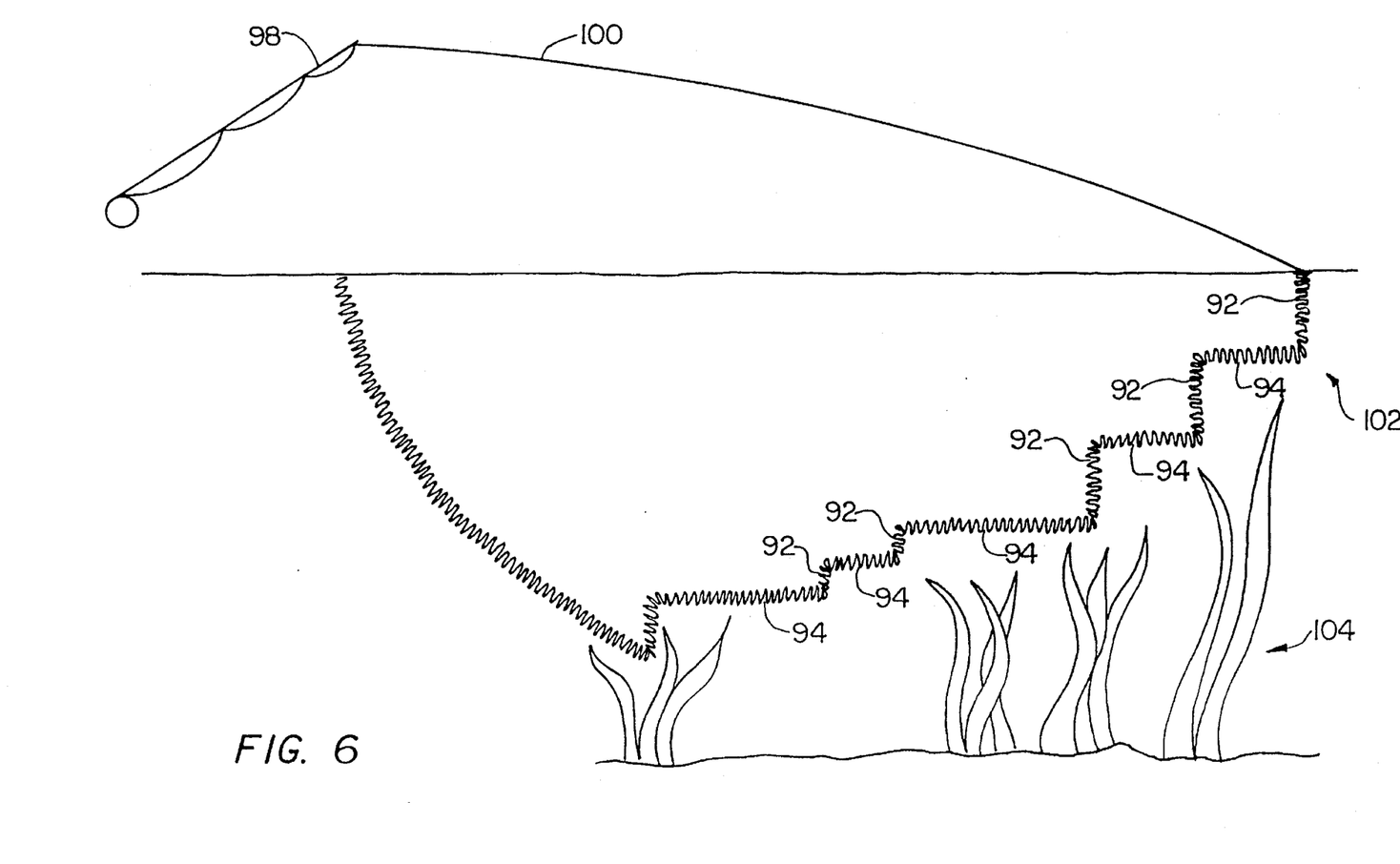
FIG. 6 is a diagrammatical view showing the path along which the fishing lure of FIG. 2 would follow.
Figure 6A:
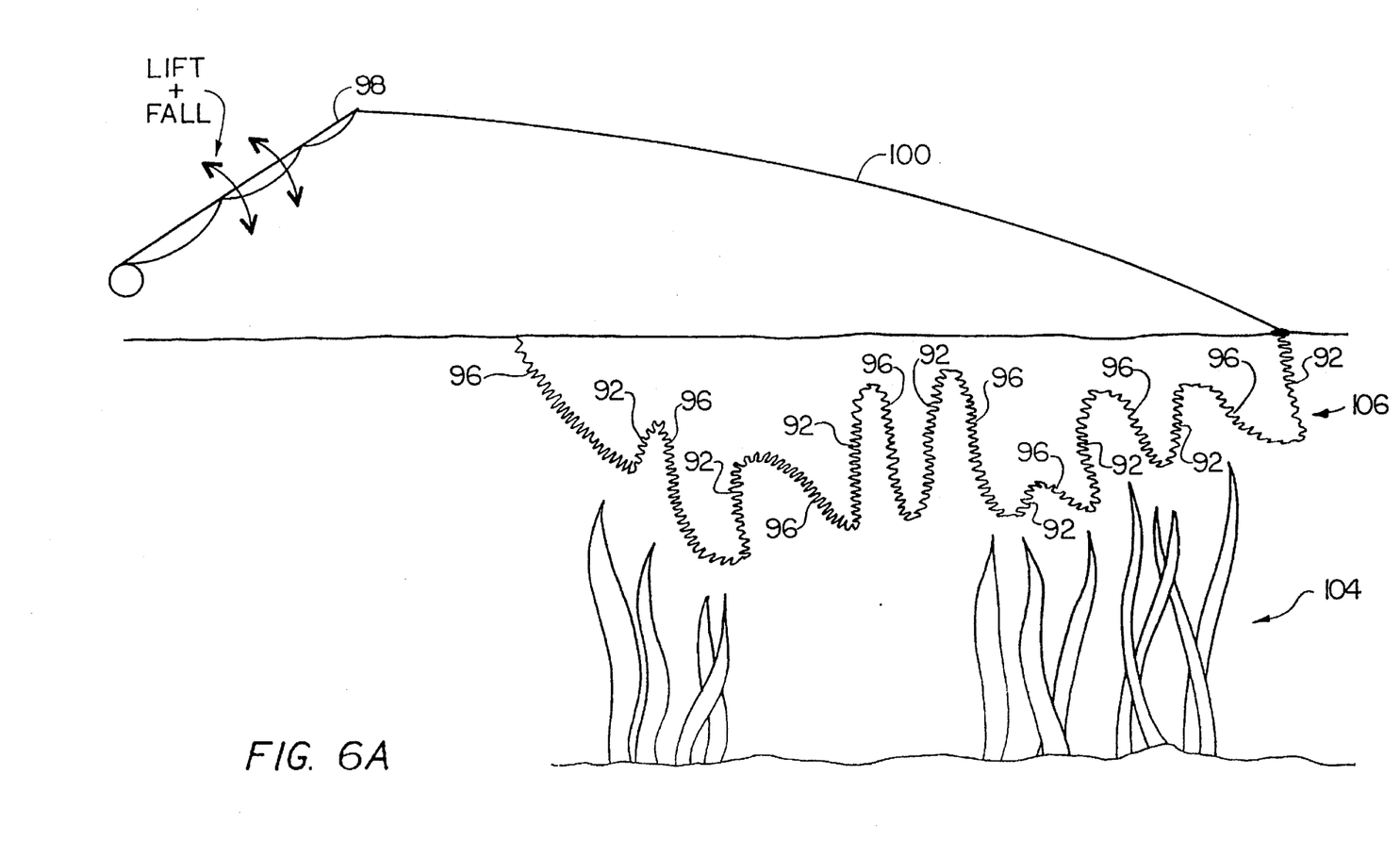
FIG. 6A is a diagrammatical view showing the path along which a fishing lure would follow.
Figure 6B:
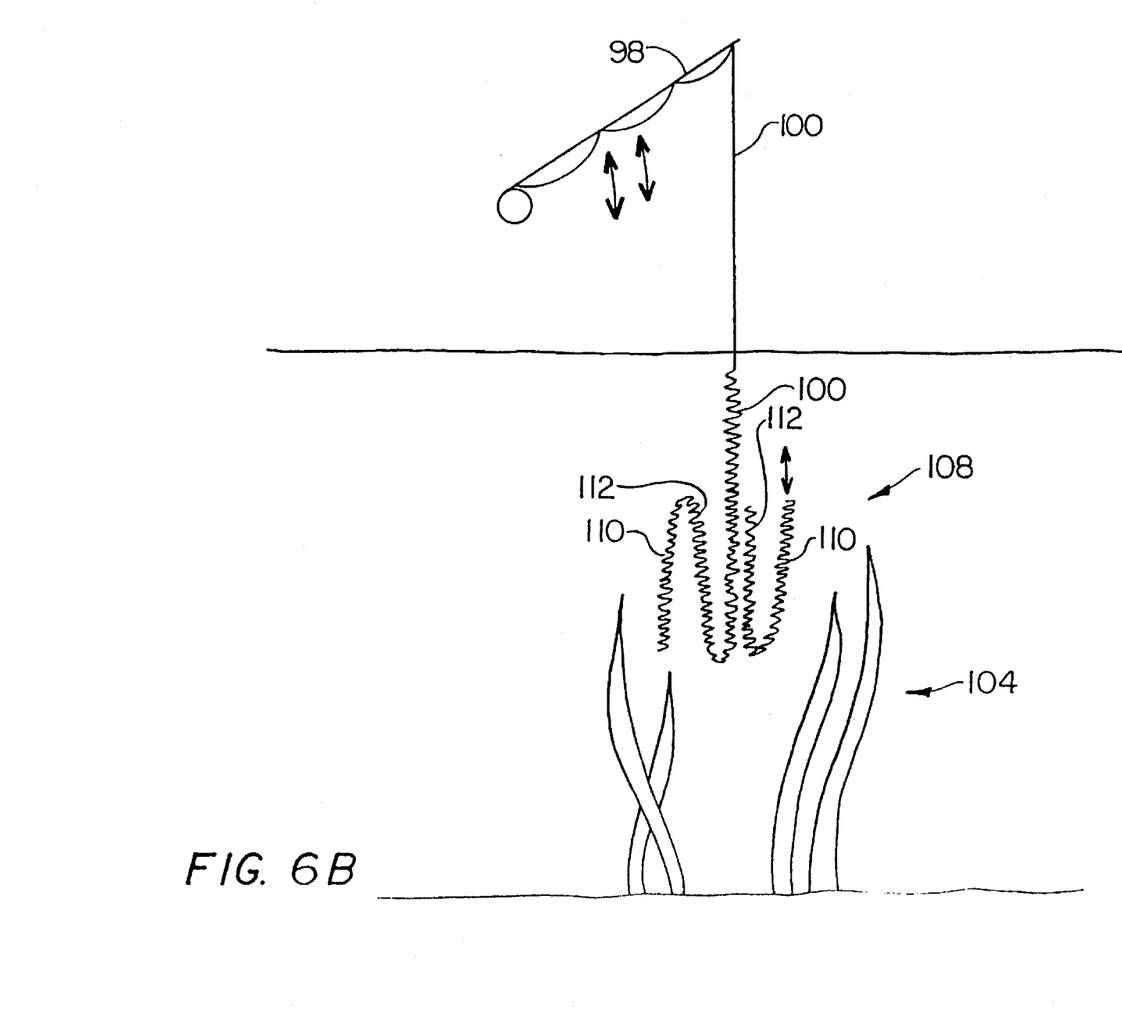
FIG. 6B is a diagrammatical view showing the path along which a fishing lure of the type described in conjunction with FIG. 3 would follow.

As will be shown in conjunction with FIGS. 6–6B, when the reeling action is terminated, lure 90 again changes its direction from the horizontal position to a substantially vertical position and again descends with the wobbling action without aid from the fisherman.

Referring now to FIG. 6, an exemplary cast and retrieve path of lure 30 (FIGS. 2–2B) is illustrated to show the dive/depth dual action and change of directions undertaken by lure 30. Here, lure 30 is shown in an environment in which the fisherman achieves two different types of action on the same retrieve. The first action occurs along a substantially vertical descent path 92 and may be described as a substantially vertical descent, side to side, slow wiggling action. It should be noted that this wiggling motion is an independent wiggling motion which occurs without any aid from the fisherman holding the fishing rod. That is, the fisherman need not have any particular skill to generate such a motion in lure 90.

The second lure action occurs along a substantially horizontal path and may be described as a substantially horizontal side to side wiggling action. Thus lure 30 is provided having a particular motion after being cast into the water and during retrieval from the water.

Such lure action may provoke fish to strike at the lure and also allows the fisherman to position and maintain the lure for relatively long periods of time in those areas believed to be occupied by fish. For example, in the present invention, a fisherman can stop retrieving the lure next to or near known fish holding structures such as rock piles, brush, submerged timber, weed beds, docks and the like generally denoted 104. In this instance lure 90 will continue to attract fish because the motion and action of the lure changing direction appears to be a bait fish swimming naturally downward.

Because lure 30 has an independent pendulum motion while following substantially vertically descending path 92 and flattens out horizontally on the fisherman's retrieve path 94, the fisherman can maintain control over the depth at which lure 30 is used. Consequently, by simply using a stop and go method, there exist a plurality of retrieve paths along which lure 30 may follow. Furthermore, in each descending path lure 30 wiggles on its own unaided by the fisherman. Thus, there exists a large number of cast and retrieve path combinations which a fisherman can present to a fish when using the lure of the present invention.

Additionally, the actions of lure 30 and the appearance of lure 30 to a fish is relatively life-like and natural. Moreover, the fisherman is able to maintain lure 30 in fish holding areas for a relatively long period of time when compared with the amount of time conventional lures can be maintained in the same areas. Thus the lure of the present invention may be more likely to attract fish.

Referring now to FIG. 6A, an exemplary cast and retrieve path 106 of lure 50 (FIGS. 3–3B) is illustrated to show the dive/depth dual action and change of directions undertaken by lure 50. In this particular application lure 50 may be provided having a weedless hook coupled to the lure body, however, the use of weedless hooks is not necessary. This is because he hooks are disposed on the bottom of lure 50 and because lure 50 rises and falls along substantially vertical directions rather than along substantially horizontal direction as do conventional lures. Thus lure 50 naturally avoids becoming tangled in weeds or the like.

In this particular example, fishing line 100 may be attached to ring 60 (FIG. 3). Thus, the lure nose becomes the lure tail and visa-versa.

Lure 50 descends with the predetermined wiggling motion 92 described above in conjunction with FIG. 6 while slowly sinking in the water. However, when the fisherman lifts his rod tip from the 9 o'clock position toward the 12 o'clock position or retrieves the lure for example, lure 90 darts vertically upward all the way to the water's surface if the fisherman so desires vibrating in an erratic pattern 96. When the fisherman returns his fishing rod to the 9 o'clock position or stops reeling in a line, lure 50 again begins a descent along path 92 while having the aforementioned pendulum-like motion. If the fisherman lifts his fishing rod slowly the lure has a lazy or relatively wide pendulum motion during its ascent along path 96. On the other hand if the fisherman lifts his fishing rod rapidly then the lure has a relatively tight pendulum motion along its ascent path 96.

Lure 50, when fished in this manner mimics the movements of a darting, diving, feeding baitfish or crayfish. As mentioned above, because lure 50 moves up and down in a substantially vertical direction, with the topside 13 (FIG. 3) toward the fisherman the lure is relatively unlikely to become tangled in the weeds and thus lure 50 may be fished in heavy cover and weed beds generally denoted 104. Thus, lure 50 has multiple actions, the pendulum or wiggling descent action and depending upon how fast the fisherman lifts his rod from the 9 o'clock position to the 12 o'clock position the pendulum or wiggling ascent action. The fisherman can thus vary his presentation numerous times on a single cast to trigger strikes and keep the lure in fish holding areas longer.

Referring now to FIG. 6B, an exemplary cast and retrieve path 108 of lure 50 (FIGS. 3–3B) is illustrated to show the capability of vertically fishing up and down commonly referred to as vertical jigging. Since, the lure attracts fish on both the fall and lift paths 110, 112 respectively a fisherman can fish for suspended fish over structure 114 repeatedly. Thus, for example a user can fish the lure in a barrel under water and have the ability to vary the action of the lure.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. A fishing lure comprising:
   a lure body having a first end and a second end and having a surface with first and second planar portions which intersect at predetermined on the surface;
   a tail coupled to the second end of said lure body;
   a pair of weights coupled to said tail, each of said weights having at least a first portion thereof eposed to a first side of said tail and each of said weights having at least a second portion thereof exposed to a second side of said tail; and
   a front lip coupled to the first end of said lure body wherein the shape of said front lip is substantially round and the shape of said tail is substantially rectangular,
   wherein when said lure follows a substantially vertical descent path through the water said lure descends along the substantially vertical path with a repetitive side to side motion.

2. The fishing lure of claim 1 wherein:
   said front lip is constructed from a material selected from one of a plastic, a wood and a metal; and
   said tail is constructed from a material selected from one of a plastic, a wood and a metal.

3. The fishing lure of claim 1 wherein said weight is disposed through said tail such that at least a first portion thereof is exposed to a first side of said tail and at least a second portion thereof is exposed to a second side of said tail wherein the first portion of said weight is substantially larger than the second portion of said weight.

4. The fishing lure of claim 3 wherein said front lip has a first surface with a first planar portion and a second planar portion wherein the first planar portion is disposed at an angle relative to the second planar portion such that when said lure rises through the water along a substantially vertical ascent path, said lure move with a side to side motion.

5. The fishing lure of claim 4 wherein the first and second planar portions of said front lip meet at a predetermined plane of the first surface of said front lip.

6. The fishing lure of claim 5 wherein the weight is provided as an integral portion of the tail.

7. The fishing lure of claim 6 wherein the shape of said front lip is substantially round and the shape of said tail is substantially rectangular.

8. A fishing lure comprising:
   a lure body having a front end and a back end and having first and second surfaces, wherein a first one of the first and second surfaces has a first flattened portion and a second flattened portion and wherein the first and second flattened portion intersect at a predetermined location on the surface;
   a first lip coupled to the back end of said lure body;
   a second lip coupled to the front end of said lure body wherein said second lip is provided having an arcuate region such that said second lip is provided having a pair of surfaces which intersect at an angle of not greater than 75 degrees; and
   at least one weight coupled to a first one of the first and second lips.

9. The fishing lure of claim 8 wherein said at least one weight is disposed on the first lip and extends above a first surface of the first lip.

10. The fishing lure of claim 9 wherein the portion of said at least one weight which extends above the first surface of the first lip is provided having a substantially spherical shape.

11. The fishing lure of claim 10 further comprising wherein:
    said first lip is provided having a substantially rectangular shape; and
    said second lip is provided having a substantially round shape.

12. A fishing lure comprising:
    a lure body havinq a front end and a back end and havinq first and second opposing surfaces, wherein a first one of the first and second surfaces has a first flattened portion and a second flattened portion and wherein the first and second flattened portions intersect at a predetermined location on the surface; and
    a first lip coupled to the back end of said lure body wherein the first lip is provided having a weight formed as an integral part thereof, said first lip having an arcuate region such that a said first lip is provided having a pair of surfaces which intersect at an angle of not greater than 75 degrees; and
    a second lip coupled to the front end of said lure body.

13. The fishing lure of claim 12 wherein the first lip is provided having a substantially rectangular shape.

14. The fishing lure of claim 12 wherein the second lip is provided having a substantially round shape.

* * * * *